Patented Jan. 13, 1948

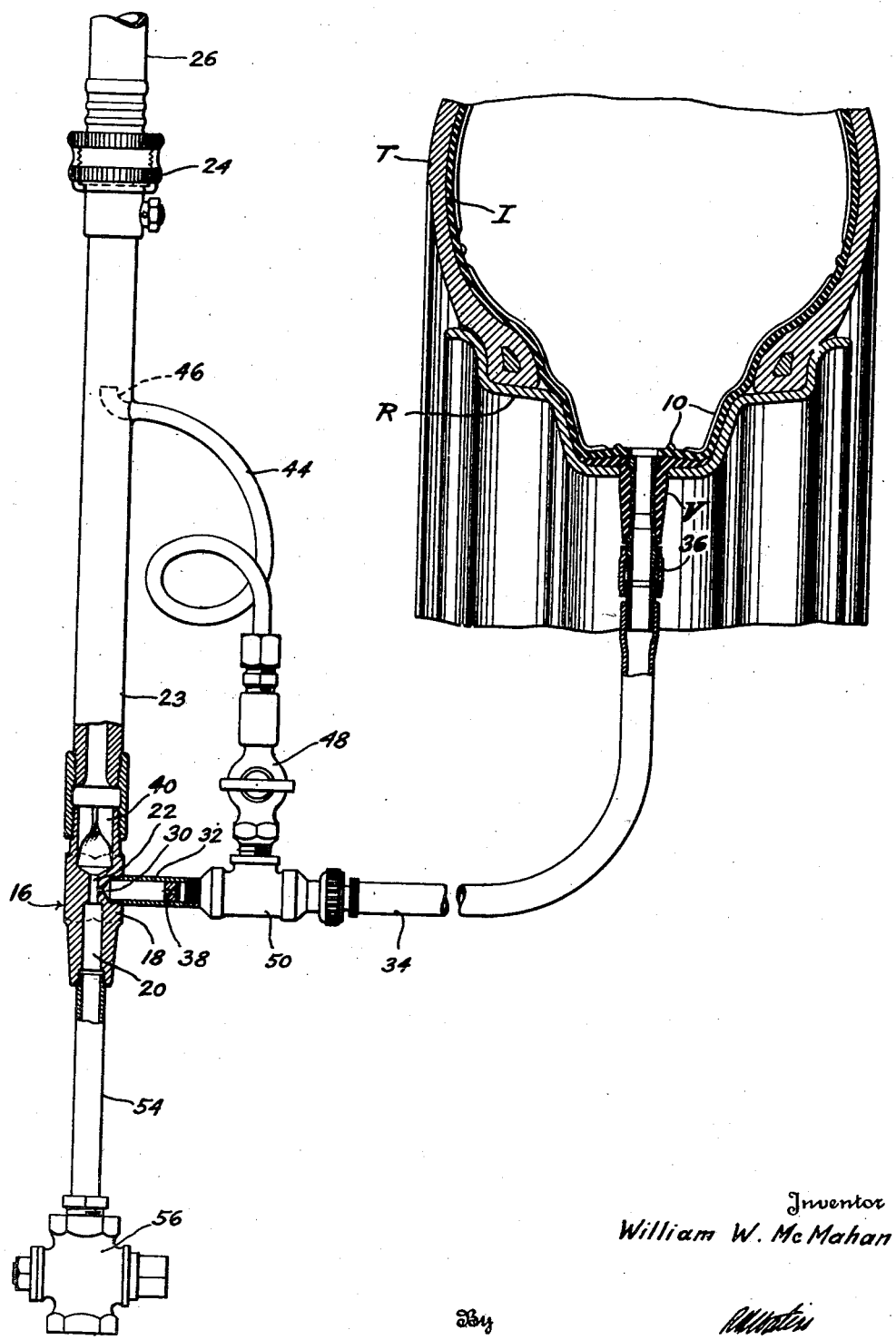

2,434,365

UNITED STATES PATENT OFFICE 2,434,365

VACUUM APPARATUS FOR FILLING TIRES WITH WATER

William W. McMahan, Akron, Ohio, assignor to Wingfoot Corporation, Akron, Ohio, a corporation of Delaware Original application July 11, 1942, Serial No. 450,624. Divided and this application January 22, 1944, Serial No. 519,304

3 Claims. (Cl. 103—262)

1

The present invention relates to means for filling a pneumatic tire, tube, and rim assembly substantially 100% with liquid, and, more particularly, is concerned with improved apparatus for filling tractor tires and the like with water.

It has been proposed heretofore to fill tractor tires with water to provide added weight and improved stability and driving characteristics for tractor operation. Various apparatus have been suggested and employed for this purpose, but substantially all of them entail filling the tire and the assembly with liquid until a pocket of entrapped air is formed, and then removing the trapped air from the pocket either by puncturing the tire and tube in the region of the pocket with subsequent sealing of the puncture, or by the removal of the entrapped air by special escape conduits.

It has long been recognized that, when the tire is only partially filled with water and the entrapped air is left in the tire, the air will gradually seep out through the very minute pores in the tire carcass or inner tube, if one is used, and the resulting reduction of pressure in the tire is highly objectionable. On the other hand, if the tire can be filled substantially 100% with water immediately, then the tire assembly can be used over very long periods of operation without any loss in tire pressure. This is apparently due to the fact that the molecules of water are sufficiently larger in size than the molecules of air, or the surface tension is greater so that water cannot pass through the very fine pores of the rubber.

It is the general object of the invention to provide improved and less expensive apparatus for filling a pneumatic tire substantially 100% with water.

Another object of the invention is the provision of inexpensive, easily-operated, light-weight, substantially fool-proof apparatus for facilitating the filling of an inner tube and pneumatic tire assembly substantially 100% with water.

For a better understanding of the invention, reference should be had to the accompanying drawings, wherein the single figure comprises a cross-sectional representation of a pneumatic tire and tube assembly and a side elevation, partly in section, of a typical embodiment of the apparatus of the invention.

In the drawings, the letter T indicates a pneumatic tire mounted on a rim R, and containing an inner tube I having a valve stem V extending through a suitable hole in the rim R. Although apparatus of the invention is particularly capable of being used in conjunction with a conventional type of inner tube, and, in fact, is almost always so used, nevertheless, the inner tube I may be formed with a plurality of narrow, circumferentially and radially extending ribs 10 on its inner surface to facilitate the exhausting of air completely from the inside of the inner tube, as hereinafter described. However, it should be particularly understood that such ribs are not necessary and are not employed in the preferred embodiment of the invention.

One embodiment of the apparatus of the invention is indicated as a whole by the numeral 16 and includes a fluid jet type of suction-producing mechanism having a body portion 18 formed with a longitudinal or straight-through bore 20 having a central portion 22 of reduced cross-section and approximately contoured to produce a Venturi tube. A conduit 23 is secured to the body portion 18 in communication with the straight-through bore 20, and the conduit 22 is adapted to be connected, as by suitable fitting 24, to a hose 26 or other means extending to a source of fluid and usually water under pressure.

The body portion 18 is provided with a small lateral passage 30 in the region of the Venturi portion 22, and a conduit 32 is connected to the body portion 18 in communication with the lateral passage 30. The conduit 32 is adapted to be connected by suitable conduit means 34 to the valve stem V of the inner tube I, for example by a threaded coupling means 36. The conduit 32 communicating with the lateral passage 30 may be provided, if desired, with an apertured plug and a strainer 38 which may be readily cleaned and which will plug up in case any dirt attempts to flow through the conduit 32 rather than having the body portion 18 of the apparatus plug up. A seat piece of rectangular metal 40, twisted through a quarter turn, may be incorporated in the end of the body portion 18 in the straight-through bore 20 at the point closest to the inlet conduit 23, in order to give the fluid a whirling motion.

The invention provides means for by-passing the flow of fluid through the body portion of the fluid suction mechanism, and such means may comprise a conduit 44 which opens through the wall of the conduit 23 and is brazed or otherwise sealed therein. If desired, the end of the conduit 44 may be turned to provide a scoop, as indicated by the dotted lines 46. The other end of the conduit 44 is connected to a plug valve 48 which is in turn connected to a T or other fitting 50 positioned between the conduits 32 and 34.

Generally, a conduit 54 is connected to the discharge end of the straight-through bore 20, in the manner shown in the drawings, and to the end of the conduit 54 is secured a plug valve 56 for purposes which will hereinafter be described.

In the operation of the apparatus, the conduit 34 of the apparatus is connected to the valve stem of the inner tube I, and the conduit 26 is connected to a source of fluid under pressure, for example, water under pressure. With the valve 48 closed and the valve 56 opened, water is then permitted to flow with considerable velocity through the conduit 23 and the straight-through bore 20 of the body 18. The Venturi portion 22 of the straight-through bore 20 greatly increases the speed of the water in this region of the body, and in accordance with the known operation of fluid jet types of suction apparatus, a suction is created in the region of the lateral passage 30. This suction, acting through conduits 32 and 34, withdraws substantially 100% of the air out of the inner tube I. The withdrawal of air from the inner tube I causes movement of the walls of the inner tube away from the inside walls of the tire, and the walls of the inner tube collapse inwardly upon each other.

This step of completely withdrawing all air from the inside of the inner tube is allowed to progress until the inner tube is completely collapsed and the inside of the tube is substantially completely exhausted of air. Thereafter, the valve 48 is opened to allow the flow of water through the conduit 44 and into the inner tube I through the conduit 34. It will be recognized that there is a substantially instantaneous change from sub-atmospheric pressure on the inside of the inner tube to the flow of liquid under pressure into the tube. Thus, at no time is any air allowed to get back into the inner tube. The flow of water into the inner tube is allowed to continue until the inner tube has moved back into engagement with the inside walls of the tire, and the flow of water into the inner tube may be expedited by closing the valve 56, although it will be understood that the size of the aperture through the plug 38 and the size of the lateral passage 30 is such that the much larger passages through conduits 44 and 34 will cause the filling of the inner tube when the valve 48 is opened even though the valve 56 is not closed.

In any event, the valve 56 is conveniently employed in conjunction with the discharge end of the straight-through bore 20 so that, by closing the valve 56, it is then possible to rapidly fill the tube I with liquid and to build up in the inner tube any desired degree of internal pressure over and above atmospheric.

From the foregoing it will be recognized that the objects of the invention have been achieved by the provision of improved apparatus for facilitating the filling of pneumatic tires substantially 100% with water, with the apparatus requiring no special valve means on the inner tube, or any special inner tube or tire construction. The apparatus of the invention is adapted to be employed in conjunction with the conventional inner tube and tire assembly, and is quickly employed by the ordinary owner or operator with a minimum of simple instructions.

This application is a division of a patent application now matured into U. S. Patent No. 2,349,594.

While, in accordance with the patent statutes, one embodiment of the invention has been specifically illustrated and described, it should be particularly understood that the invention is not to be limited thereto or thereby, but that the scope thereof is defined in the appended claims.

I claim:

1. Apparatus adapted to exhaust and then fill a pneumatic tire and inner tube assembly with liquid comprising a hydraulic jet vacuum mechanism, a main tube extending from the mechanism and adapted to be connected to a pressure hydraulic supply, a lateral tube extending from the mechanism at a point substantially adjacent to the jet and adapted to be connected to the inner tube, a conduit permanently connecting the main and lateral tubes for by-passing the mechanism, valve means for opening and closing the conduit, and valve means for closing the discharge of the mechanism and causing auxiliary flow of the hydraulic fluid through the lateral tube to the inner tube.

2. A hydraulic suction apparatus employing a supply of fluid under pressure for exhausting fluid from a container and filling the same with fluid under pressure from the fluid supply, said apparatus comprising a body having a Venturi passage extending therethrough; a lateral passage in the body opening into the Venturi passage; conduit means connecting one end of the body with the supply of fluid under pressure; conduit means connecting the lateral passage with the container; conduit means connecting both of the aforementioned conduit means for by-passing the body; valve means for opening and closing the by-pass conduit means; and valve means for controlling the discharge end of the body to cause any fluid supplied by the first named conduit means and not carried by the by-pass conduit means to flow through the lateral passage and augment the fluid flow of the by-pass conduit means to the container.

3. A hydraulic suction apparatus employing a supply of fluid under pressure for exhausting fluid from a container and filling the same with fluid under pressure from the fluid supply, said apparatus comprising a body having a Venturi passage extending therethrough; a lateral passage in the body opening into the throat of the Venturi passage; a first conduit means connecting one end of the Venturi passage with the supply of fluid under pressure; a second conduit means connecting the lateral passage with the container; a third conduit means connecting the first and second conduit means for by-passing the body portion; valve means connected to the other end of the Venturi passage; and valve means for controlling the by-pass conduit means and enabling the fluid-filling pressure to be substituted for the suction in the container with substantially no intervening time interval upon the actuation of both valve means.

WILLIAM W. McMAHAN.

REFERENCES CITED

The following references are of record in the file of this patent:

UNITED STATES PATENTS

| Number | Name | Date |
|---|---|---|
| 1,121,297 | Schmitt | Dec. 15, 1914 |
| 1,491,115 | Taylor | Apr. 22, 1924 |
| 1,630,543 | Scott | May 31, 1927 |
| 2,349,594 | McMahan | May 23, 1944 |

Certificate of Correction

Patent No. 2,434,365. January 13, 1948.

WILLIAM W. McMAHAN

It is hereby certified that error appears in the printed specification of the above numbered patent requiring correction as follows: Column 2, line 18, for the word "approximately" read *appropriately*; and that the said Letters Patent should be read with this correction therein that the same may conform to the record of the case in the Patent Office.

Signed and sealed this 30th day of March, A. D. 1948.

[SEAL]

THOMAS F. MURPHY,
*Assistant Commissioner of Patents.*